United States Patent [19]
de Rafael et al.

[11] Patent Number: 5,926,793
[45] Date of Patent: Jul. 20, 1999

[54] DIGITAL-TIMESHARE-EXCHANGE

[76] Inventors: Carey A. de Rafael, 6 Bishop La., Menlo Park, Calif. 94025; Rafael Amezcua Arreola, 220 W. Broadway, M-24, San Diego, Calif. 92101-3877

[21] Appl. No.: 08/711,508

[22] Filed: Sep. 10, 1996

[51] Int. Cl.⁶ .................................................. G06F 17/60
[52] U.S. Cl. .................................................. 705/5; 705/6
[58] Field of Search .................................. 705/27, 37, 1, 705/5, 6, 14, 26

[56] References Cited

U.S. PATENT DOCUMENTS

| | | | |
|---|---|---|---|
| 4,799,156 | 1/1989 | Shavit et al. | 705/26 |
| 4,984,155 | 1/1991 | Geier et al. | 705/26 |
| 5,063,507 | 11/1991 | Lindsey et al. | 705/26 |
| 5,267,148 | 11/1993 | Kosaka et al. | 705/37 |
| 5,285,383 | 2/1994 | Linsdey et al. | 705/26 |
| 5,500,793 | 3/1996 | Deming et al. | 705/37 |
| 5,689,652 | 11/1997 | Lupien et al. | 705/36 |

*Primary Examiner*—Allen R. MacDonald
*Assistant Examiner*—Romain Jeanty
*Attorney, Agent, or Firm*—Brown, Martin, Haller & McClain

[57] ABSTRACT

A novel Digital-Timeshare-Exchange that includes a database and an automated process that uses specific steps to instantly trade, sell, or exchange timeshare properties within a digital network environment. In this unique process all the steps are executed and completed by any individual user connected anytime, from any location. The procedures are done automatically, electronically, independently, interactively, and in real-time, by using a suitable computer and an appropriate communications medium.

8 Claims, 21 Drawing Sheets

DIGITAL-TIMESHARE-EXCHANGE

BRIEF SUMMARY OF THE INVENTION

This invention relates to a novel digital process that provides a means for any person, located anyplace and operating within a digital network environment, to independently initiate and automatically complete an instant trade, sale, or exchange of available timeshare properties.

BACKGROUND OF THE INVENTION

Timesharing or vacation ownership began in Europe in the middle of the 1960's. Ski resorts in the French Alps were the first to experiment with the idea. Later, in the 1970's the ideas and procedures became well known. It is now estimated that over 3 million timeshares have been sold since 1980 and currently there are approximately 3 thousand vacation ownership resorts in over 75 countries.

The idea of exchanging a vacation ownership week for another vacation week in a different resort began in 1974 when Resort Condominiums International (RCI) was formed by Christel and John DeHaan. Other companies such as Interval International (II) subsequently joined the timeshare industry and in 1994 both companies performed over 1.6 million exchanges using a restricted, cumbersome, slow, and expensive process for the timeshare owner.

The process being used for trading by the major exchange companies, such as RCI and II, requires that a member use a telephone or write a letter in order to "SPACEBANK" a week which is then made available for trade to another member. A member can also "REQUEST" a different week for another desired time and location and a search is conducted by the exchange company employees and the member is informed by telephone or letter if the requested time and place is available. In most instances a member is informed that the requested time and location is not available and new searches for other locations, which can take several months, will be required. Oftentimes the requested timeshare units may actually be available but the member is told that the unit is not available. This misinformation along with allegations that the exchange companies conduct secret tuneshare ratings cause confusion to the members and mistrust of the timeshare industry.

From the 3 million timeshares sold it is estimated that over 200 thousand owners in the United States alone want to sell their timeshares at any one time. The usual procedures for resale are through classified ads, auctions; and Estate Sales. A few large resorts provide resale programs which get very little attention and most smaller resorts can not conduct resale programs. In addition, owners are discovering that there is no appropriate system or mechanism for selling or purchasing used timeshares. In fact, in a 1992 survey conducted by Resort Property Owners Association it was found that 58 percent of timeshare owners wanted to sell but only 3 percent were able to do so.

Presently, the usual procedure to conduct and complete the purchase of a timeshare property is to personally visit the site, and listen to hours of high pressure sales from the resort representatives. For most people there is very little opportunity to visit other sites in the United States or other countries to compare values.

DETAILED DESCRIPTION OF THE INVENTION

Introduction

This invention addresses and solves the problems described above in a unique and novel manner. Any person who uses this invention and follows the process and prescribed steps can automatically, electronically, independently, and interactively trade, sell, or exchange timeshare properties instantly using a suitable computer and an appropriate communications medium.

Requirements for using this invention

Figure 1:
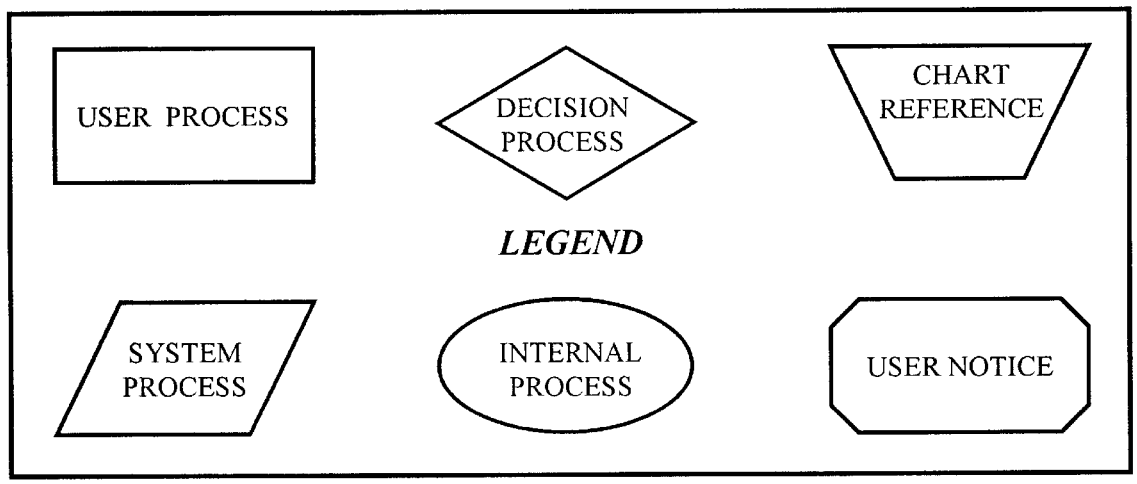
FIGS. 1 and 1A describes the steps for connecting to and accessing a Digital-Timeshare-Exchange.
Figure 1:
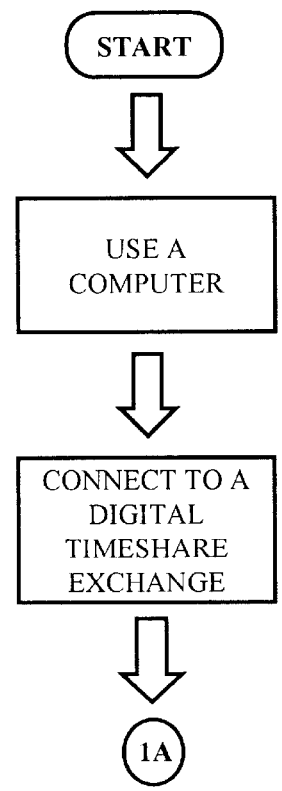
Figure 1A:
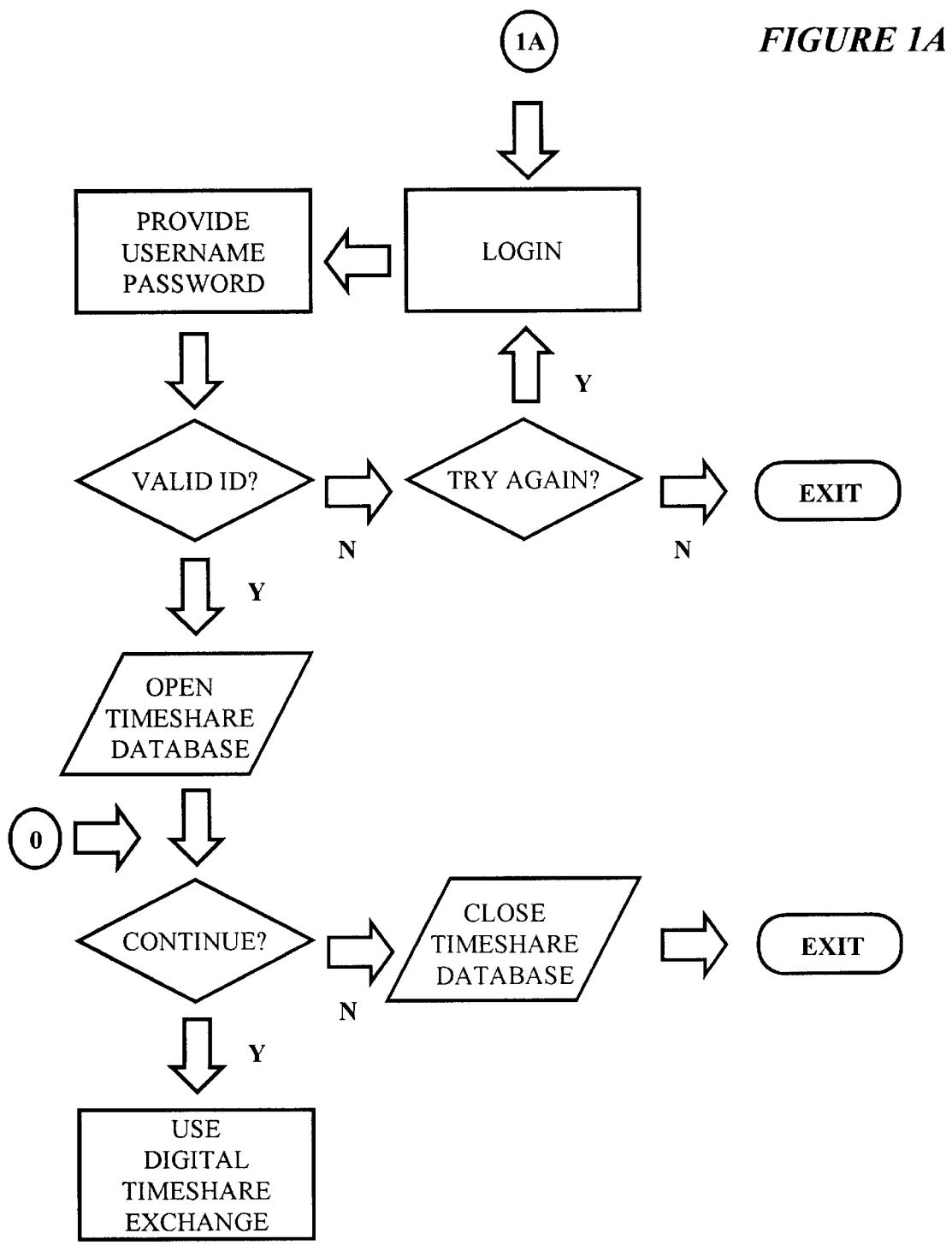
Figure 1B:
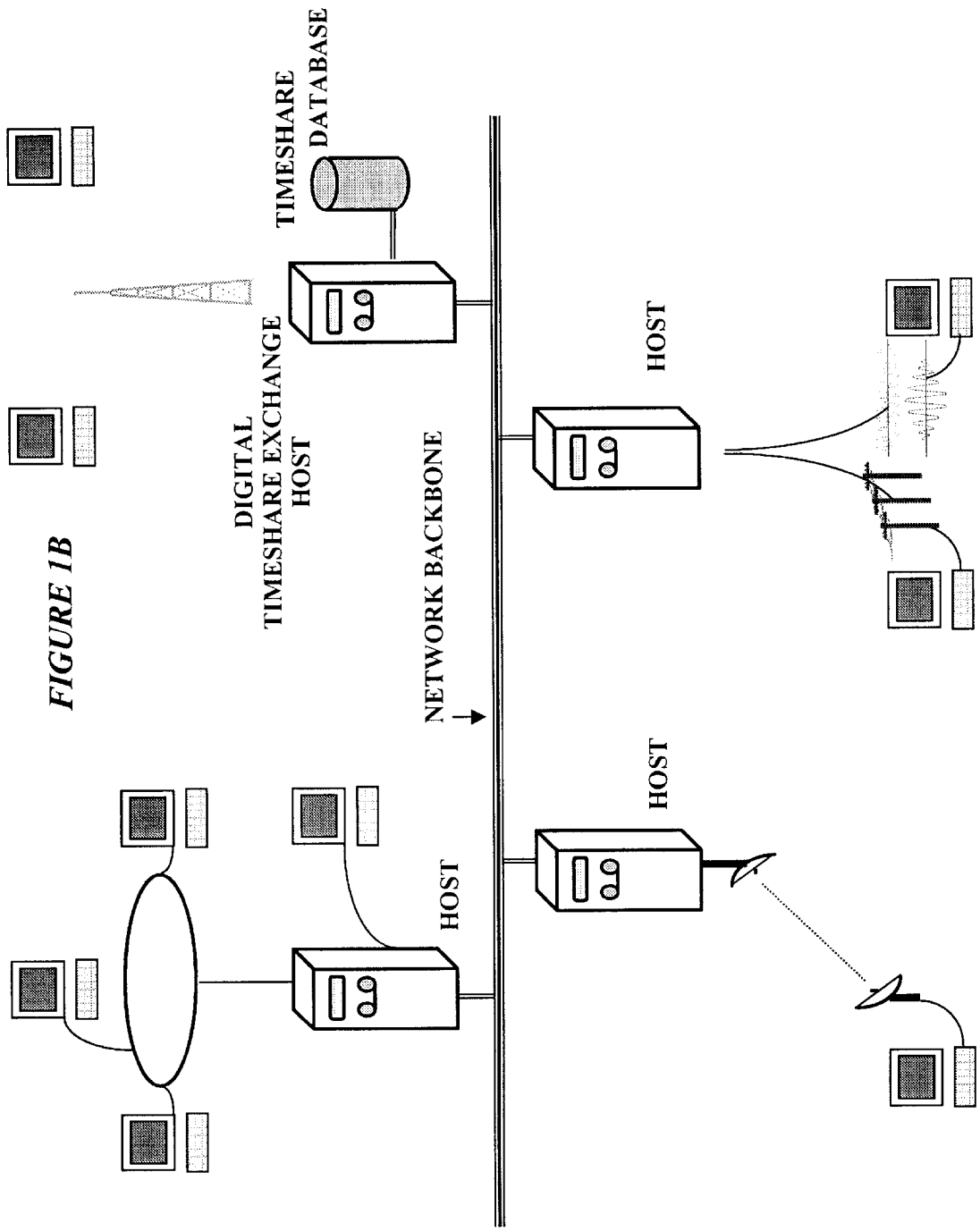
FIG. 1B shows examples of potential digital network environments.

To use this invention, a user must connect to a Digital-Timeshare-Exchange by means of a computer with an appropriate communications apparatus over a transmissions medium as illustrated in FIG. 1B. The communications apparatus is a physical device, such as a satellite or modem, and communication software. The computer can be a personal computer or any digital computing device capable of connecting to and communicating with a digital network environment.

As illustrated in FIG. 1A, when a user connects to a Digital-Timeshare-Exchange, the user must provide a username and password in order to use this invention. This is done to identify and protect the claims and actions of each user, and to simplify each user's task by requiring the system to correlate, track, and record the users actions. If a user provides the correct username and password, the timeshare database is opened, and the user is given the access and authority to use this invention.

Use of this invention in a trading process

Trading time on a timeshare property is an automated process controlled by an individual user. A user can be a current owner of a timeshare property who intends to electronically deposit some specific ownership of a timeshare into an account. By depositing a specific time, a user can then apply the time deposited to trade for another specific timeshare property.

The deposit as specified by the procedures in this invention is an automated process that is done with computers, where a user is given instructions on executing a series of steps, and the authority to initiate and interact with the process. To make a trade, a user simply follows the steps to execute the process for generating a trade. This process of timeshare trading gives a user complete access and freedom to search and trade for any timeshare currently available in the timeshare database. Unlike the conventional and current procedures of timeshare trading, this computerized process of trading gives unprecedented and independent control to a user for searching and retrieving timeshare information and the ability to dynamically trade and instantly complete a trade in real-time.

How the steps are executed in a deposit

Figure 2:
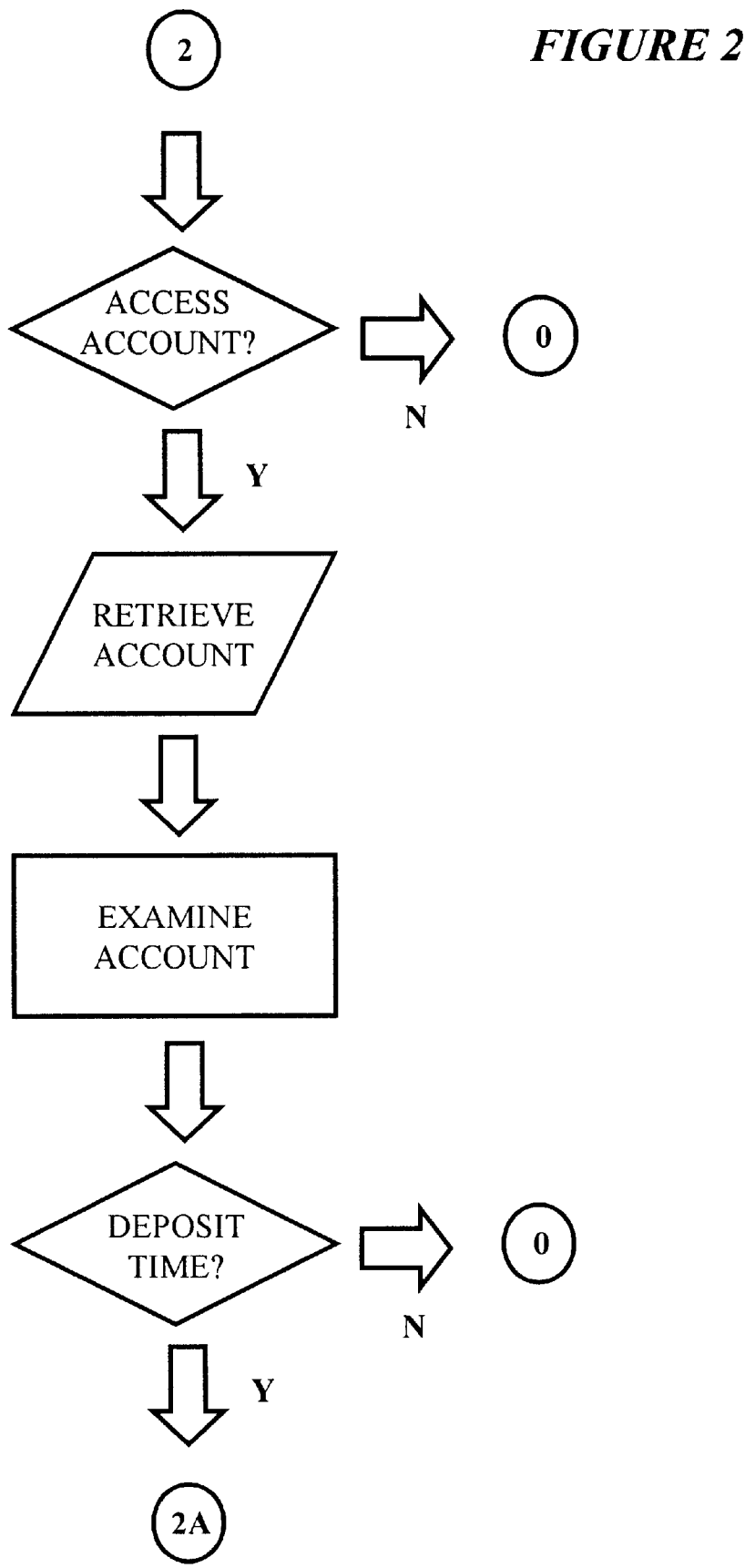
FIGS. 2, 2A and 2B describe the process and steps to be taken for submitting a timeshare deposit.
Figure 2A:
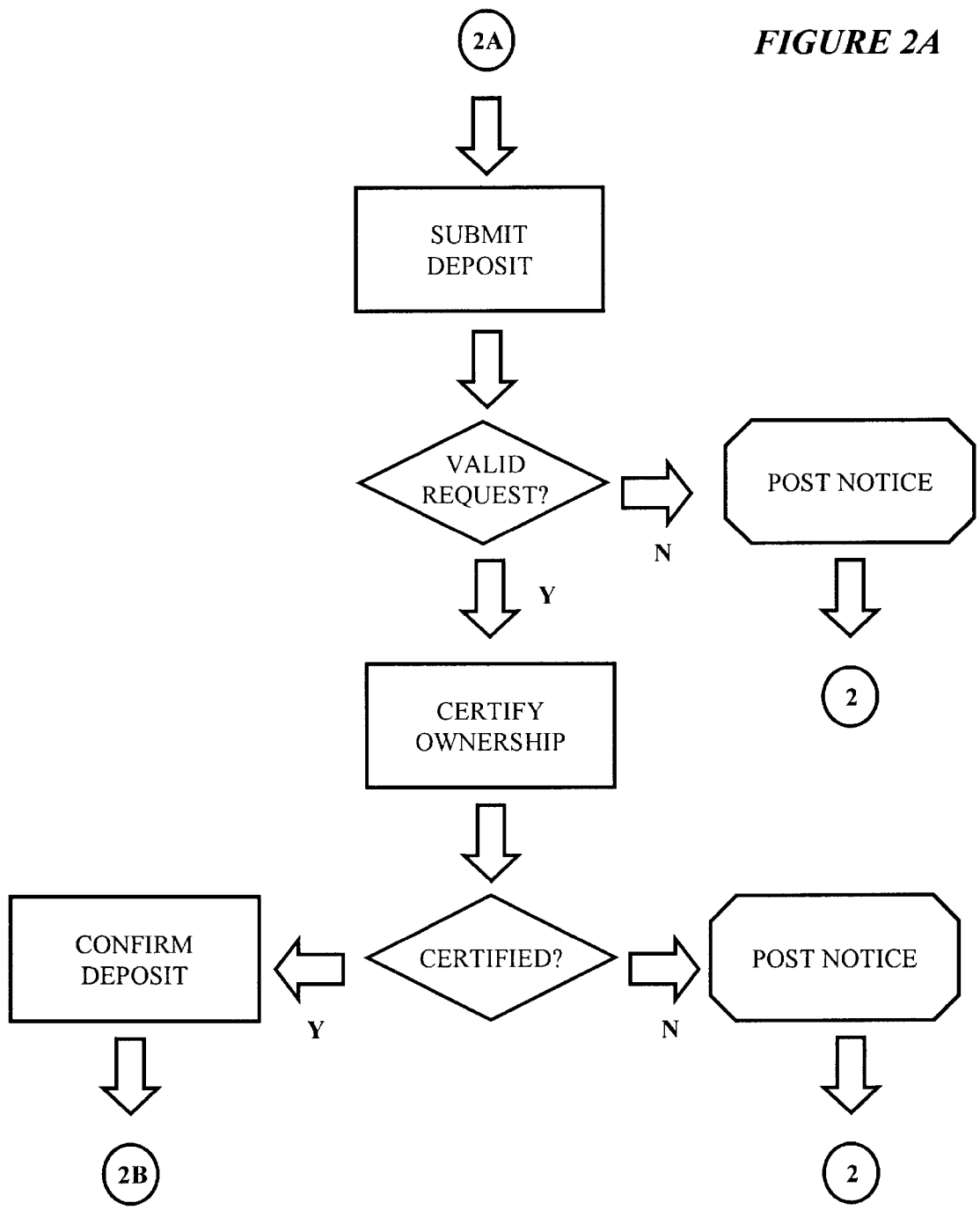

As illustrated in FIG. 2, the process for depositing time begins with accessing the user's account. The account is created the first time a user registers to enter into this system. As illustrated in FIG. 2A, to make a deposit, the user submits a deposit request form. If the request is valid, that is the deposit is of an acceptable and approved timeshare property, the user is required to certify ownership of the timeshare. If ownership is certified, the user is asked to confirm the deposit.

Figure 2B:
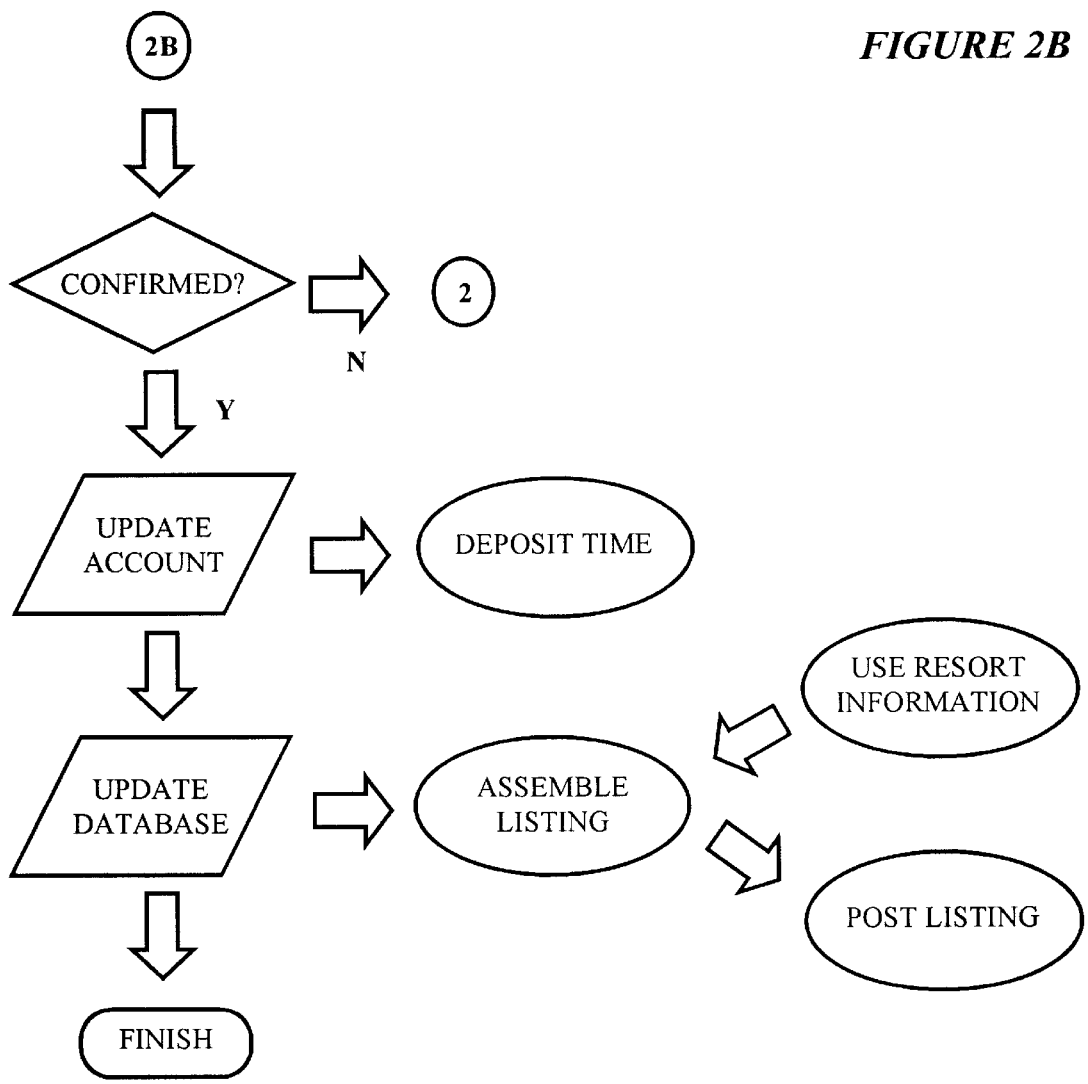

If a deposit has been confirmed, a set of digital steps is launched to complete this process as illustrated in FIG. 2B. The user's account is automatically updated to record the deposit and the user's respective account for the time deposited is credited. When a successful deposit of a timeshare is made, a listing for the timeshare is assembled and posted in the timeshare database. (see FIGS. 2 and 2A)

How the steps are executed in a trade

Figure 3:
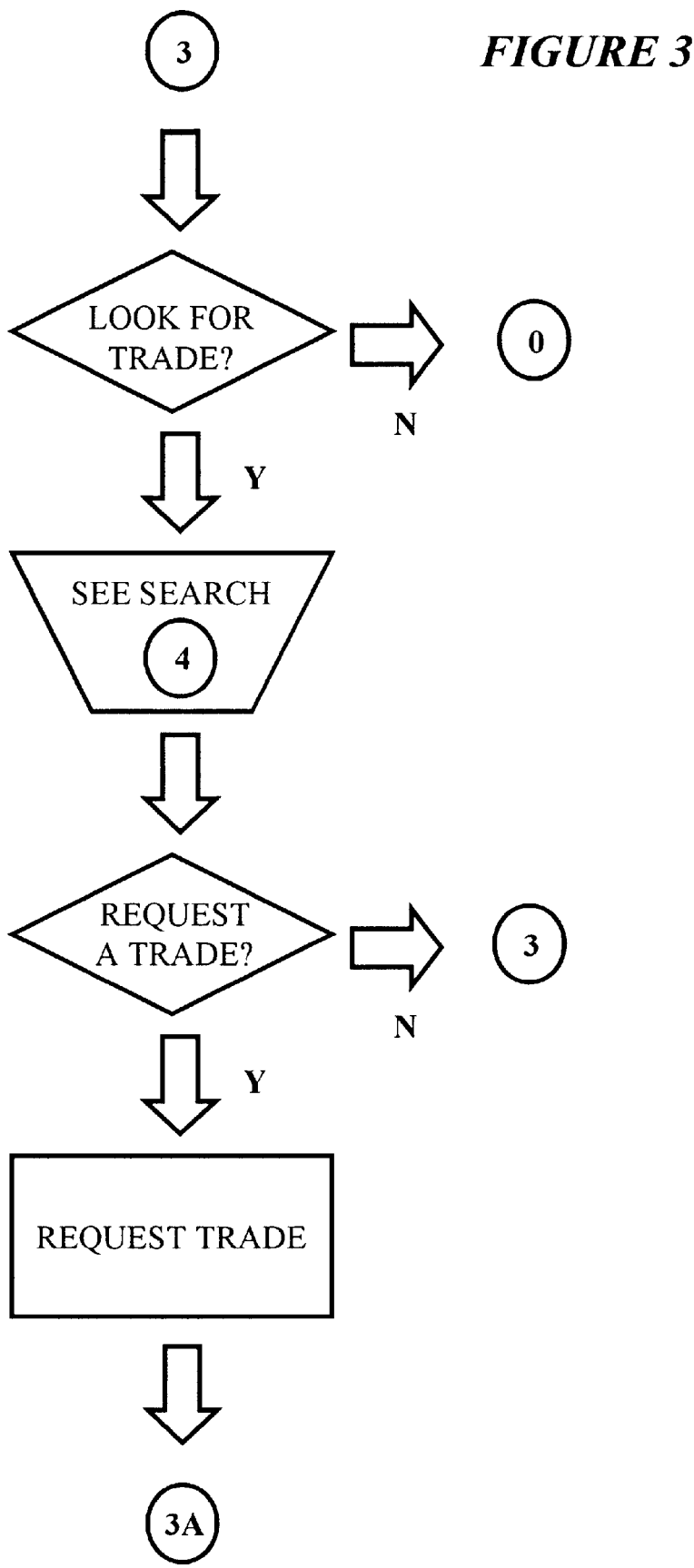
FIGS. 3, 3A, 3B and 3C describe the process and steps for making a timeshare trade.
Figure 3A:
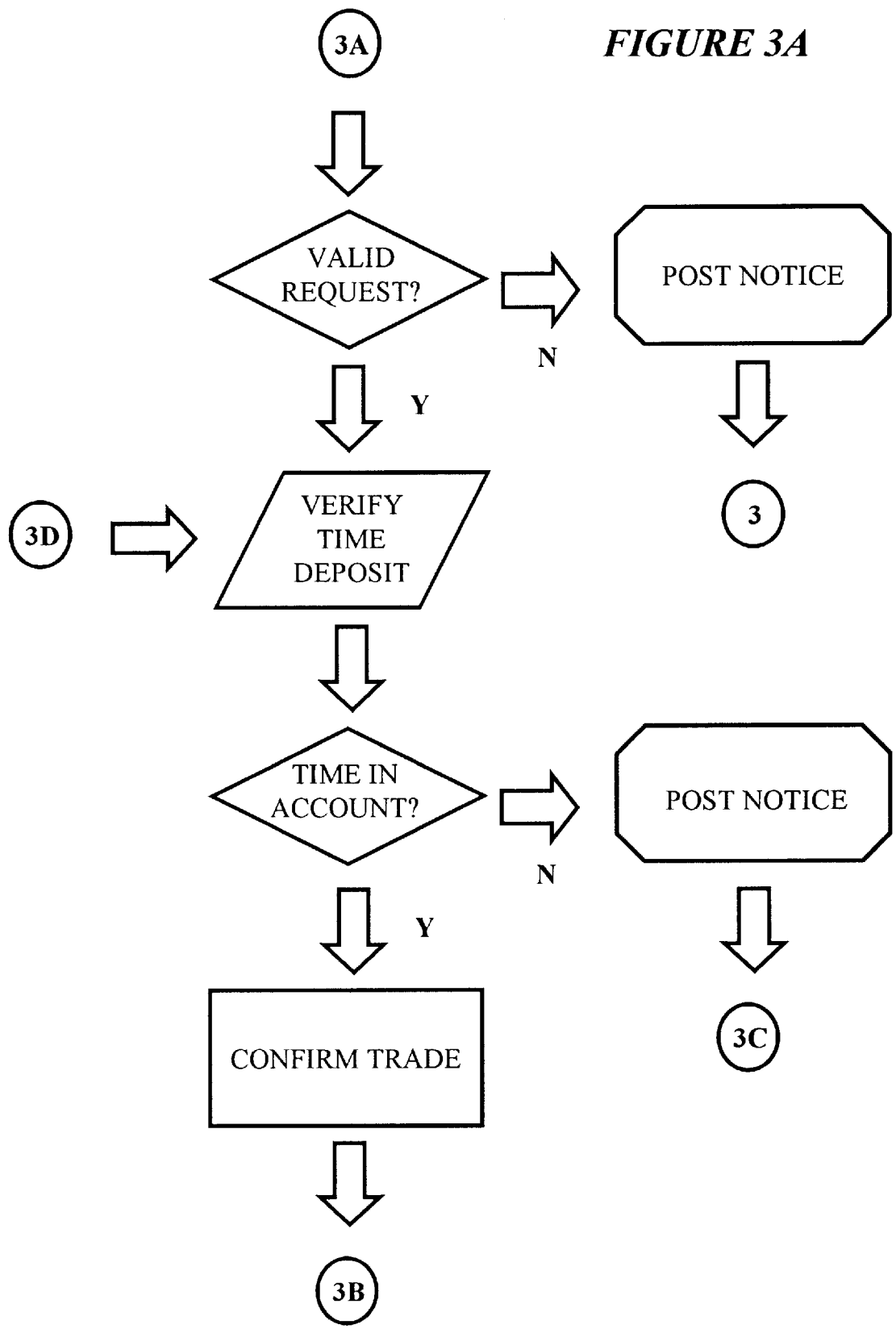

The first step in the process of timeshare trading begins with a user searching for a timeshare available for trade in the timeshare database. This searching process is described below. When a user finds an available timeshare to trade for, the user submits a trade request form. As illustrated in FIG. 3A, if the request is valid, that is the desired time in a timeshare is available for trade, an official time deposit or credit for the user is verified. If the users account indicates that no equivalent deposit is available for trade, the user can at this step make a deposit as described above. If a deposit has been accepted, the user is asked to confirm the trade.

Figure 3B:
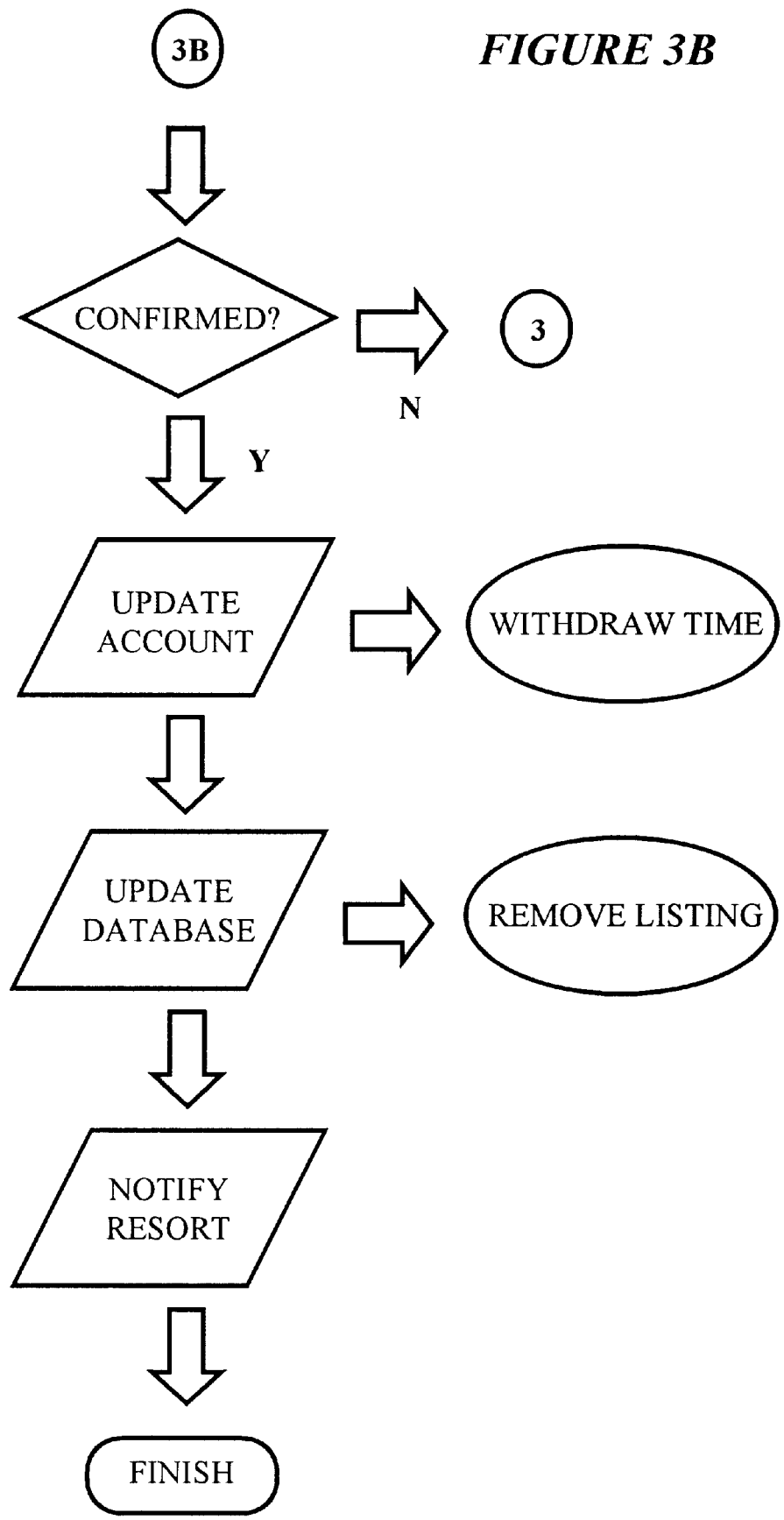
Figure 3C:
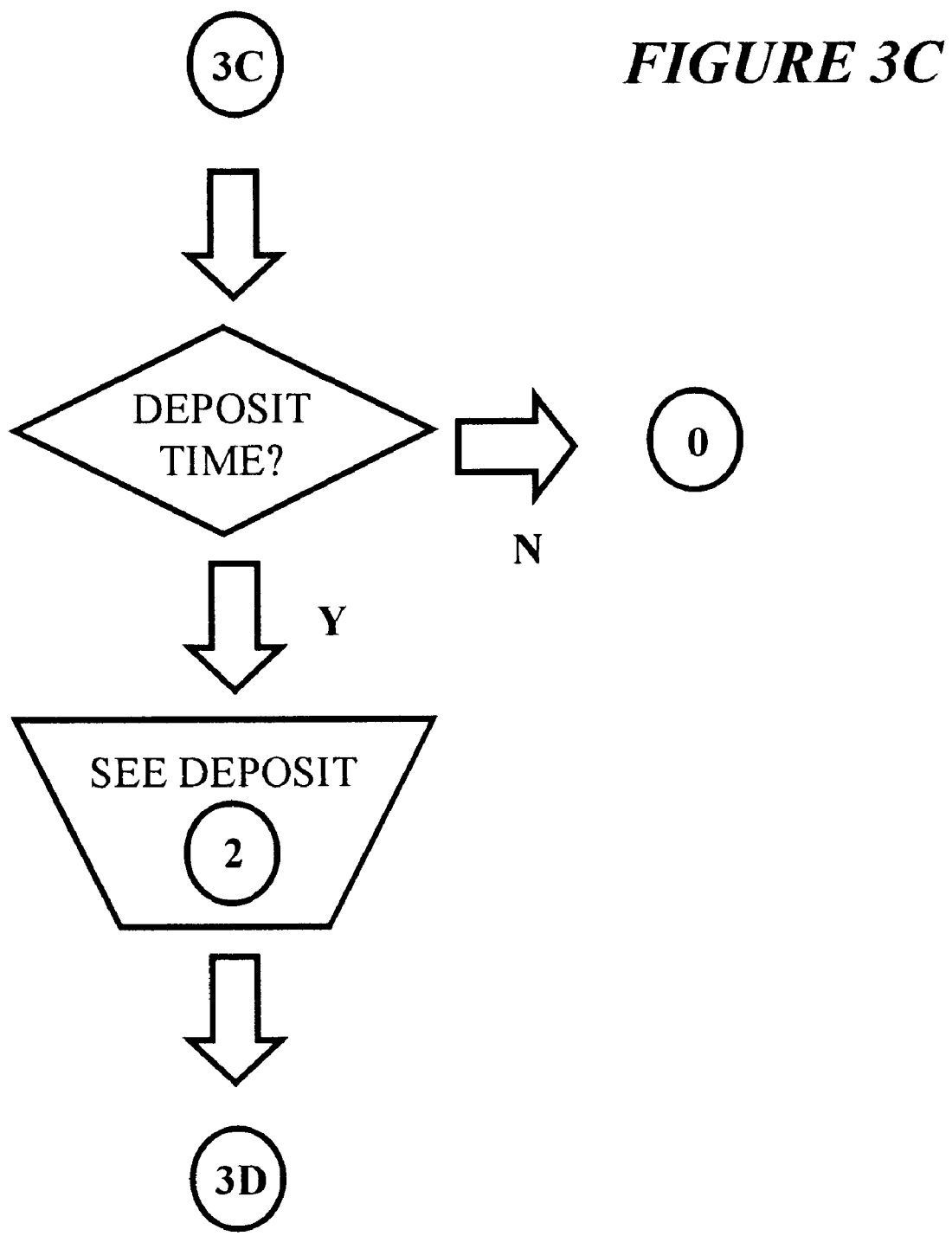

As illustrated in FIG. 3B, and 3C, if a trade has been confirmed, a set of digital steps is launched to complete this process. The user's account is automatically updated to record the trade and the user's respective account for the time deposited is debited. Availability of the time taken from the timeshare is removed from the timeshare database and the timeshare property management is notified of the trade.

How searching is performed in this invention

The process of searching is an integral part of a Digital-Timeshare-Exchange. Searching allows a user to find any assorted array of timeshare properties based on general or specific information of timeshares incorporated within the system.

Figure 4:
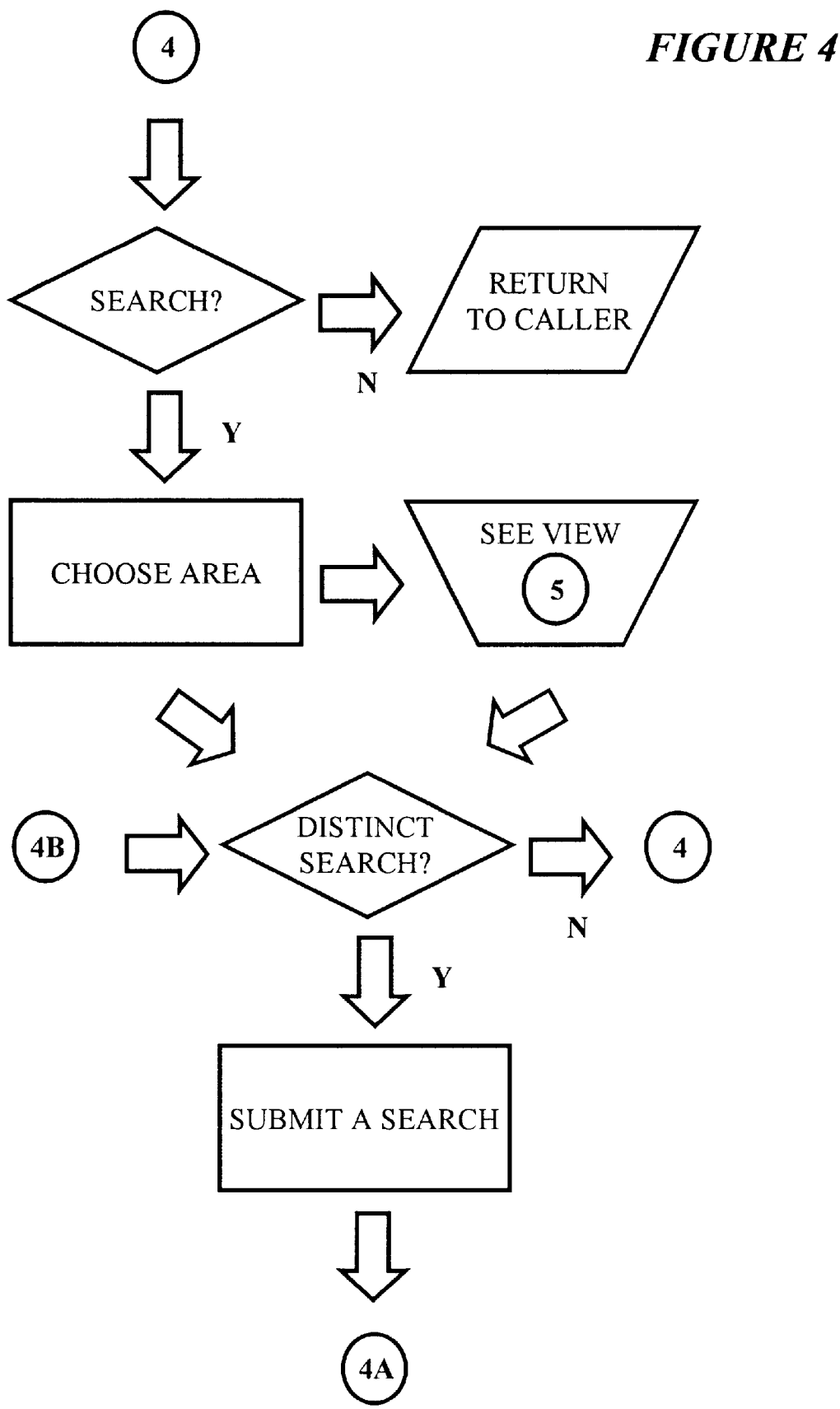
FIGS. 4 and 4A describe the process and steps for conducting a timeshare search.

As illustrated in FIG. 4, to begin a new search, a user chooses from pre-defined sectors or specific regions of the world. This step is accomplished by one of two methods. Either the user can select the area(s) from hyper-linked graphical maps or from a series of text based menus. Once selected, the user can opt to view all timeshare listings for the area(s) or can construct a search to narrow the current selection. Viewing timeshare listings is described below. If the user chooses not to further a search, the user is returned to the next process step from which searching was initiated.

As further illustrated in FIG. 4, to construct a search for distinct timeshare properties, a user selects the criterion upon which the search is defined. Once the criterion has been selected, a user submits a request to process the search. By default, the domain of the search is restricted to the current area(s) the user has selected. However, the user is given the option of a global search if so desired.

Figure 4A:
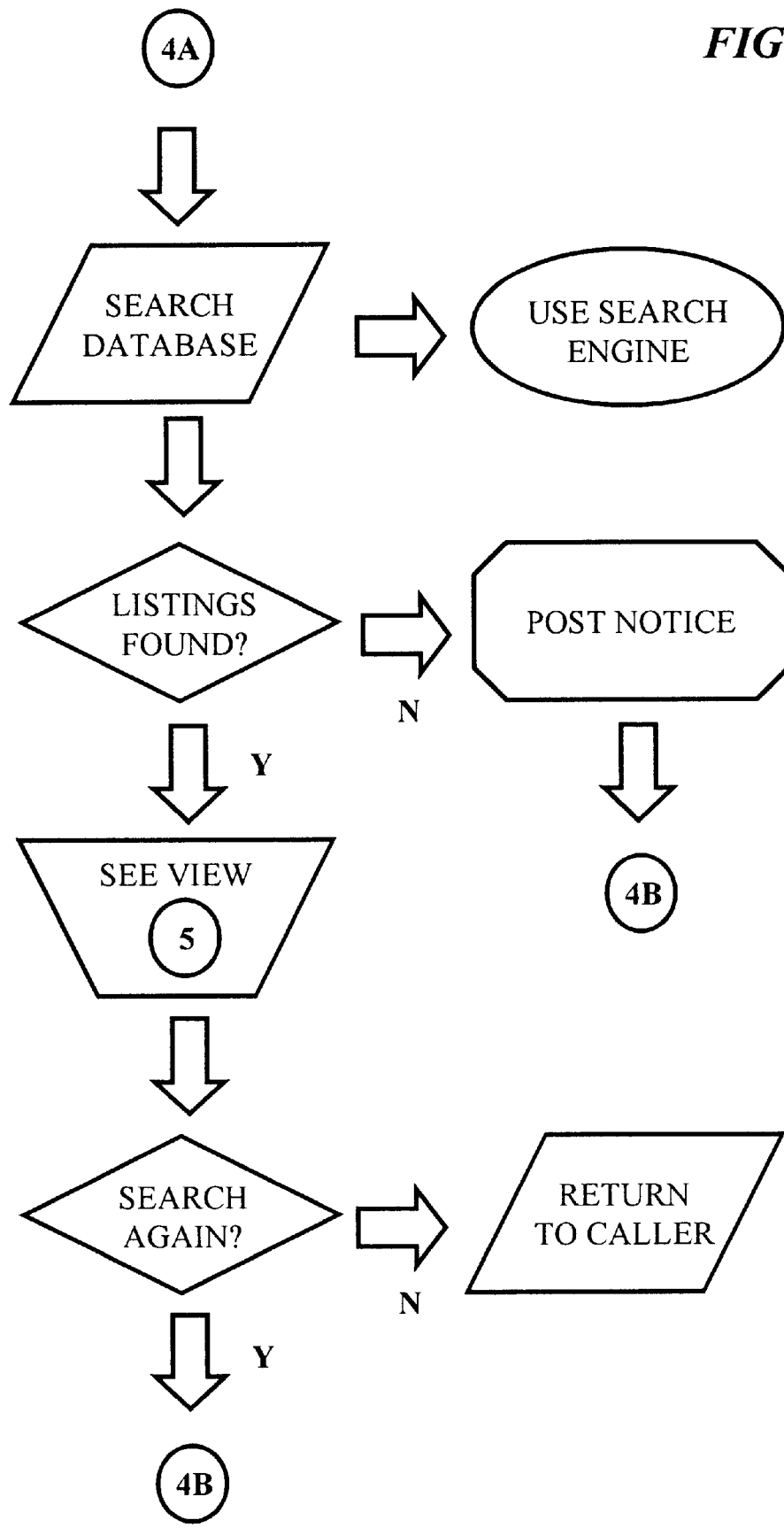

If a search produces an empty list (i.e. no listings were found given the user's criterion), the user receives a notice and is given a choice of redefining the search, beginning a new search, or returning to the next process step from which searching was initiated. As illustrated in FIG. 4A, in response to the search criterion, the computer searches the database.

If a search successfully yields any listings, the listings are given to the user for viewing. When the user is finished viewing, the user can either begin a new search, or return to the next process step from which searching was initiated.

Searching is a procedure widely utilized in many digital information based systems. Within the Digital-Timeshare-Exchange schematic, searching in the timeshare database can be encompassed as a single step in a process that calls for a search.

How a timeshare listing is viewed in this invention

Figure 5:
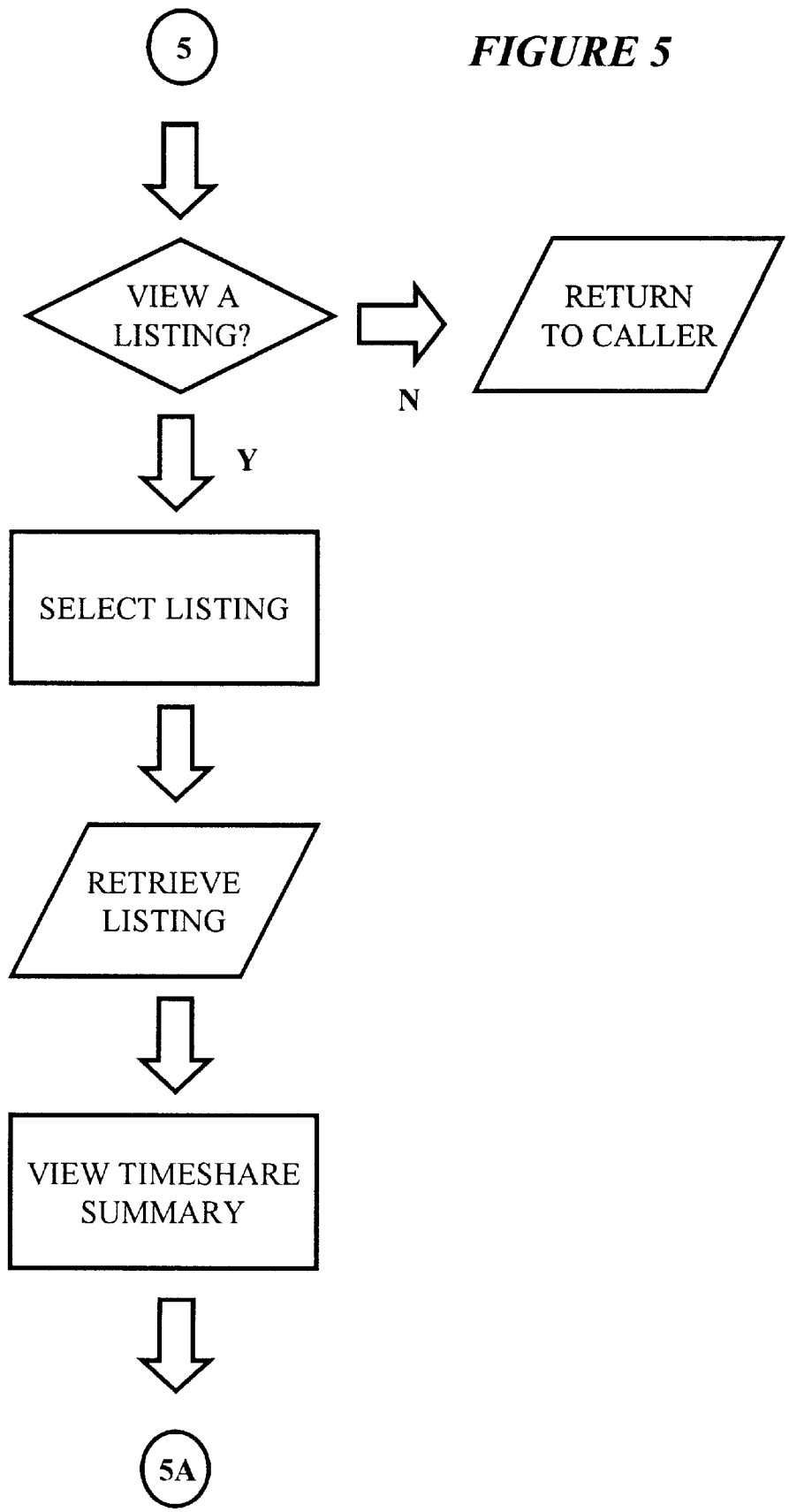
FIGS. 5 and 5A describe the process and steps for viewing a timeshare listing.
Figure 5A:
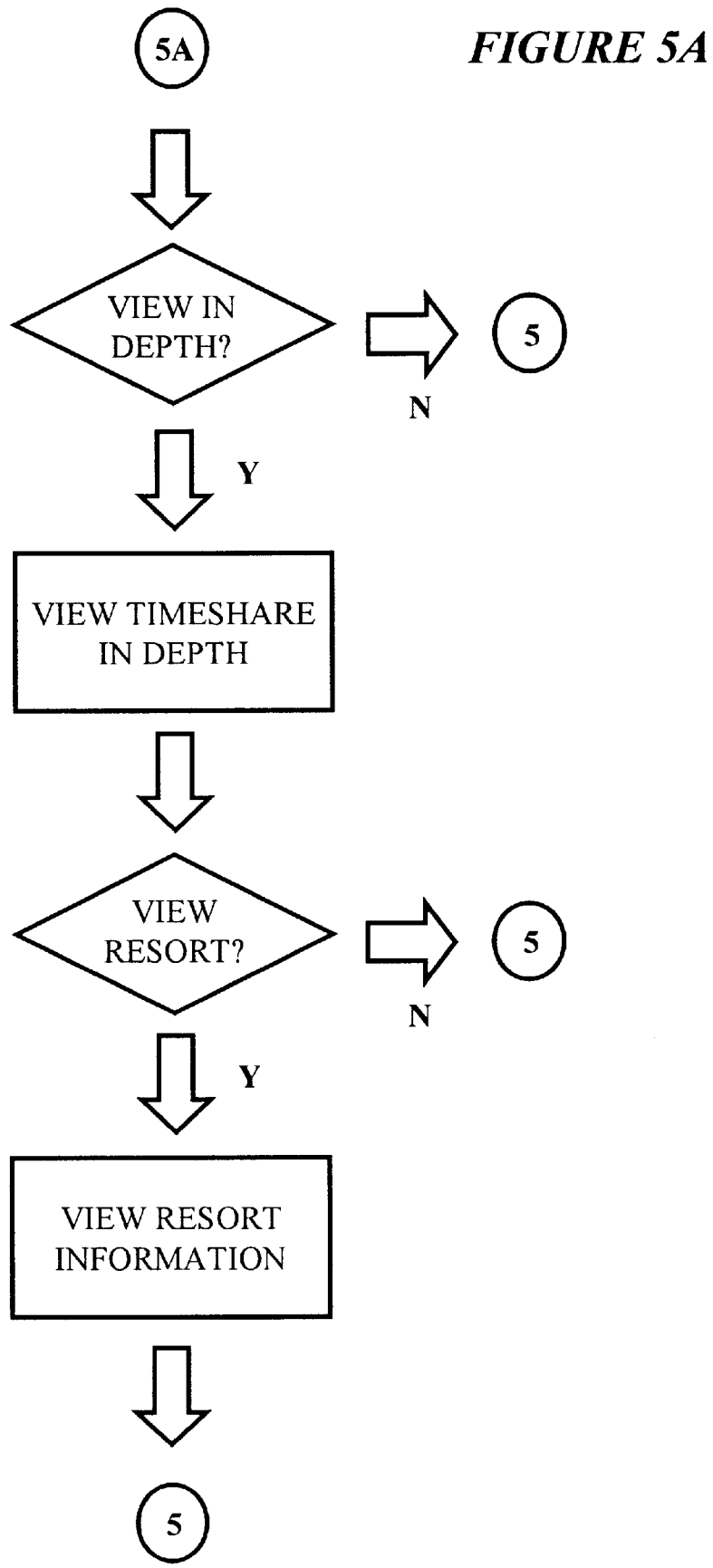

Viewing a timeshare listing with this invention is a simple user action. As illustrated in FIG. 5, the process begins when the user is given (i.e. from a search) a selection of timeshare listings to view. When the user chooses to view from the selection a particular timeshare listing, the listing is retrieved from the timeshare database. A timeshare listing may include any information contributed by the timeshare property owner with relevant information and detailed descriptions of the property as well as images, video, and as illustrated in FIG. 5A, the user can choose to view such in depth timeshare information. When the user has finished viewing the particular listing, the user can choose to view another listing from the current selection, or return to the next process step from which viewing was initiated.

Use of this invention in a owner exchange process

The following procedures and steps describe how specific time or an entire ownership of a timeshare is exchanged between an owner and a purchaser with automated processes that enable a user to automatically and independently sell, buy, or trade on acceptable and approved timeshare properties.

The listing process, as described below, is a set of steps that enables an owner or authorized agent of a timeshare property to easily and flexibly list the owner's timeshare in the timeshare database and to set the terms and conditions for the specific listing: allowing the owner a choice to list specific portions of time or an entire timeshare in exchange for money or for trade at another equivalent timeshare property. The purchasing process, as described below, is a set of steps that enables a user to quickly and readily purchase or make a trade on a timeshare listed in the timeshare database. Both the listing and purchasing processes are automated procedures, where all of the steps are performed and completed electronically, interactively, and in real-time.

How the steps are executed in a listing process

Figure 6:
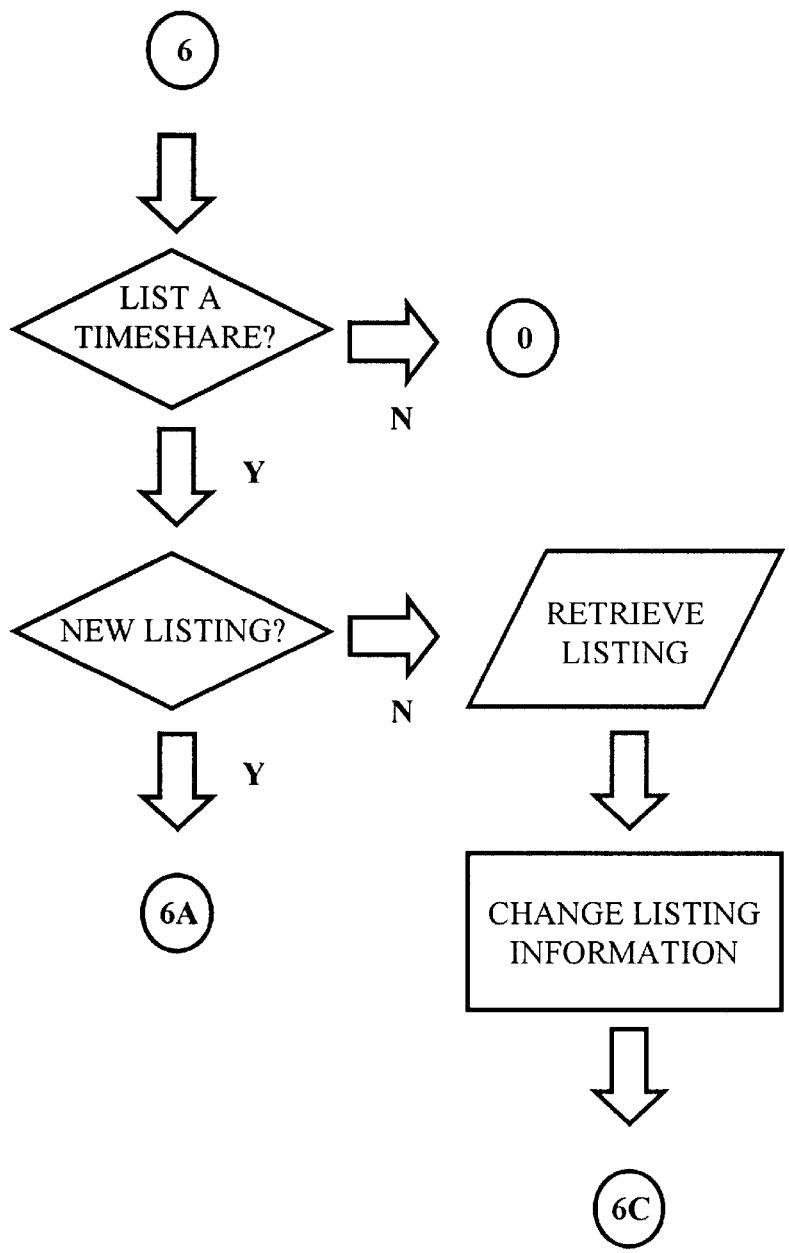
FIGS. 6, 6A, 6B and 6C describe the process and steps for submitting and revising a timeshare listing.
Figure 6A:
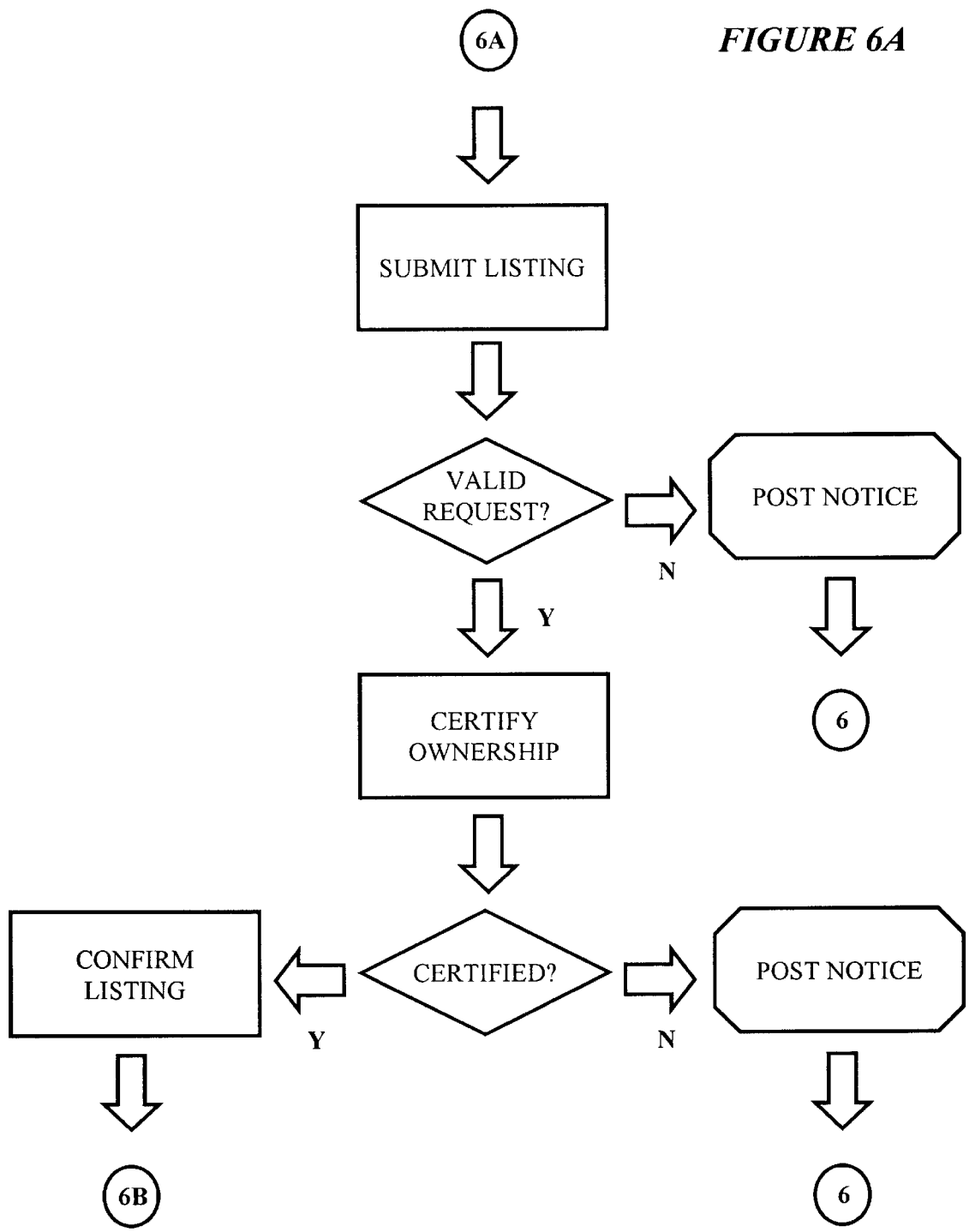
Figure 6B:
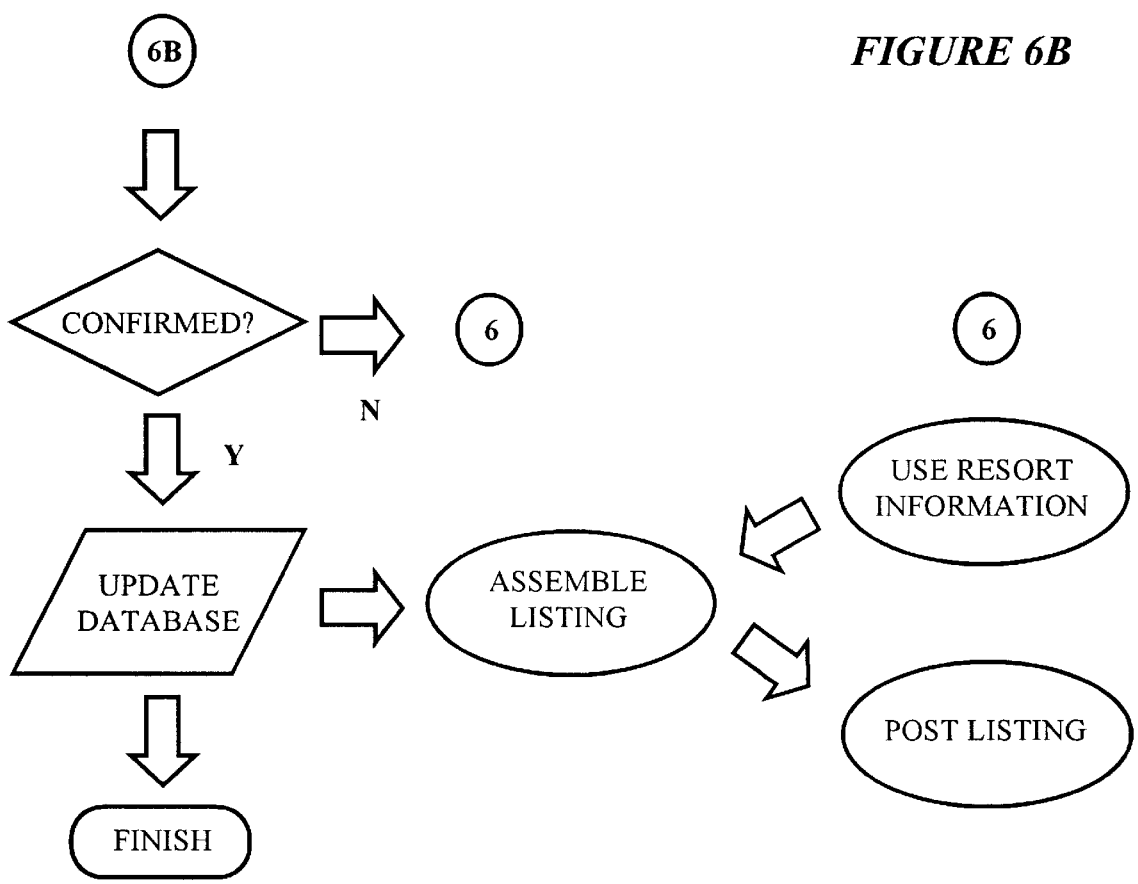
Figure 6C:
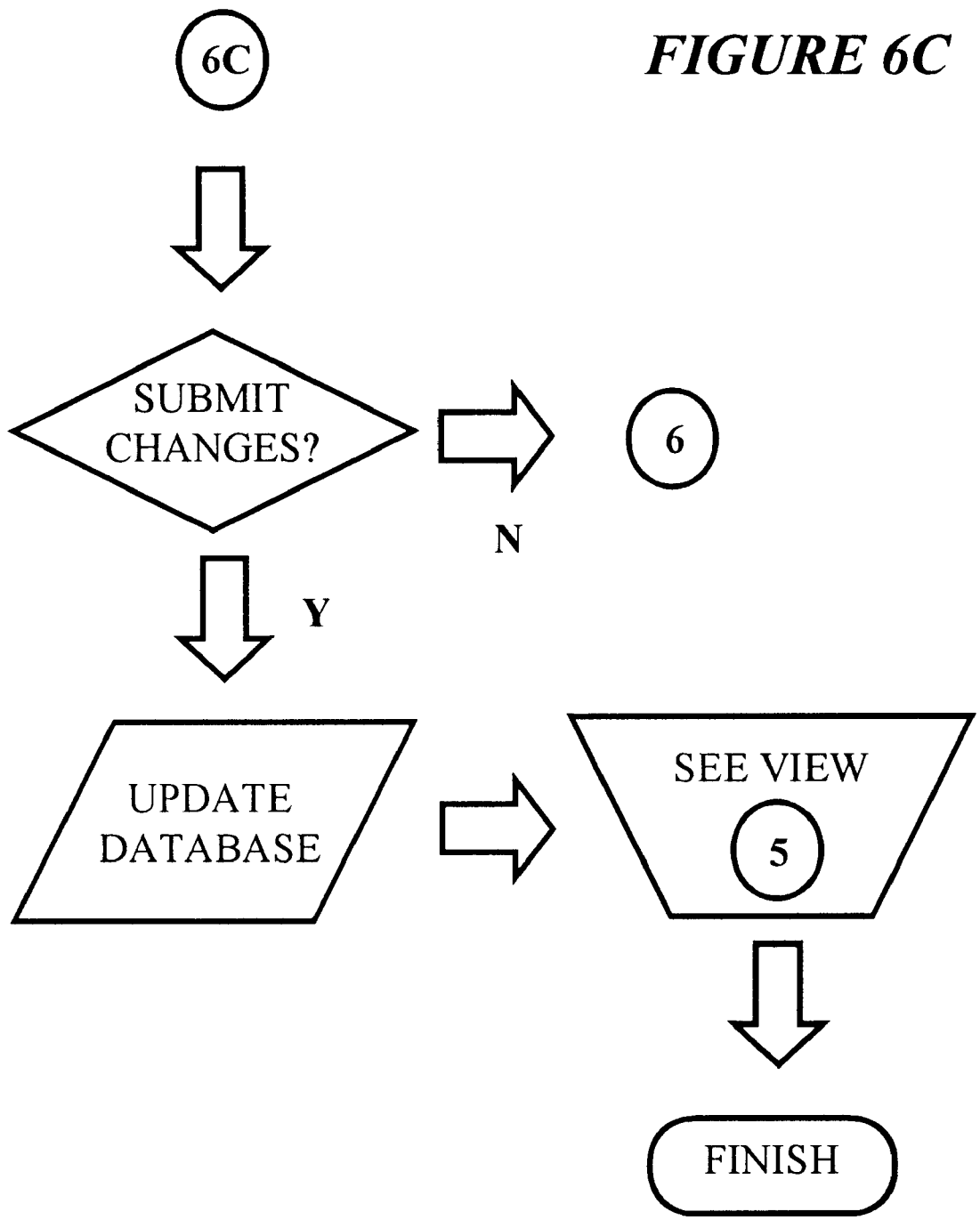

As illustrated in FIG. 6, to assist in the process of listing an owner's timeshare with this invention, an authorized user begins by updating information on a current property or creating a new listing. If the user chooses to revise information on a current listing, the user's listing information is retrieved from the timeshare database. If changes are submitted, the timeshare database is updated. To list a new timeshare, the user submits a post request form. As illustrated in FIG. 6A, 6B, 6C, if the request is valid, that is the timeshare is of an acceptable and approved timeshare property, the user is required to certify ownership of the timeshare and asked to confirm the decision to post. If the decision is confirmed, a listing is assembled and the timeshare is posted in the timeshare database.

How the steps are executed in a purchasing process

Figure 7:
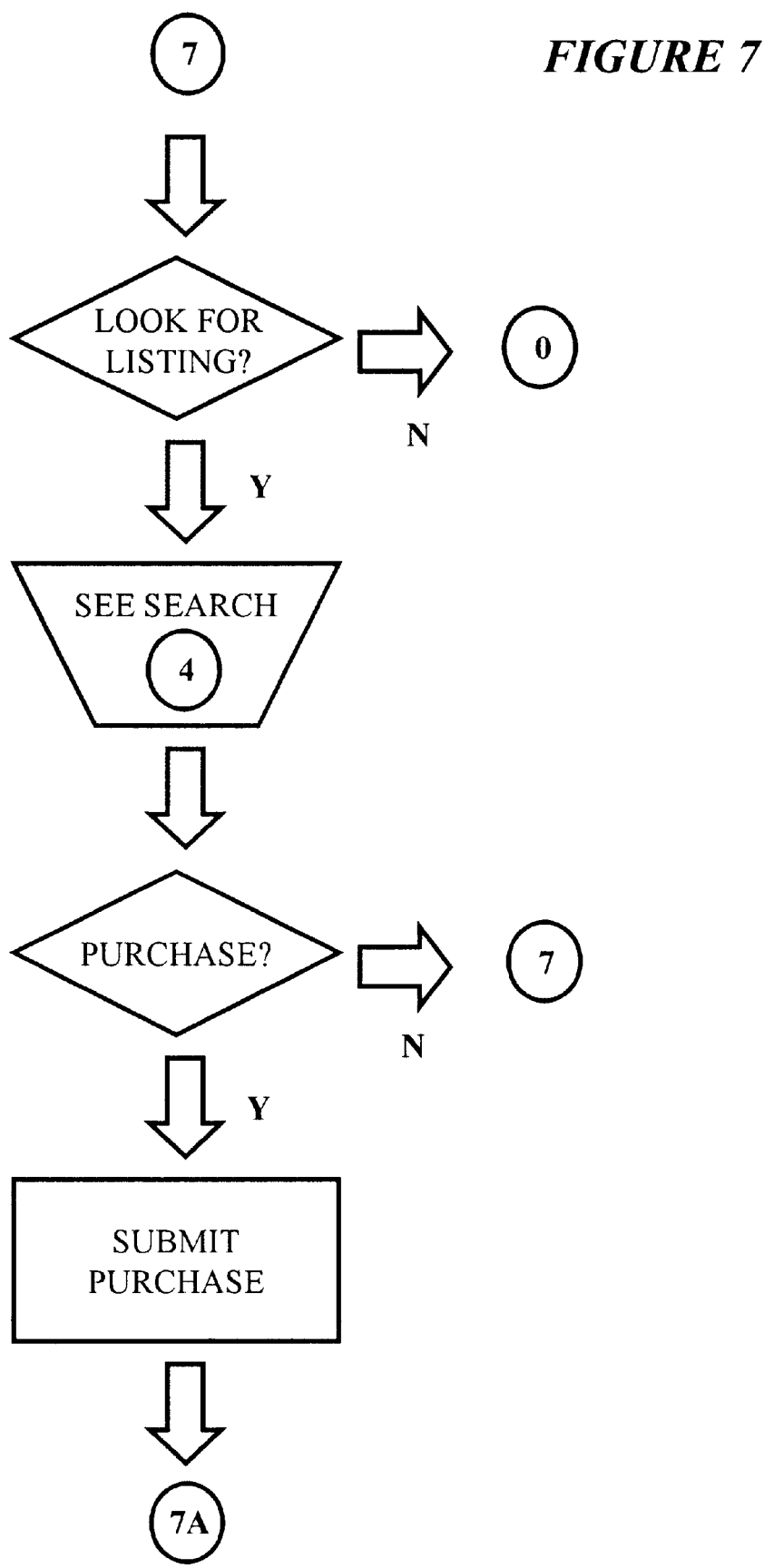
FIGS. 7, 7A, and 7B describe the process and steps for making a timeshare purchase.
Figure 7A:
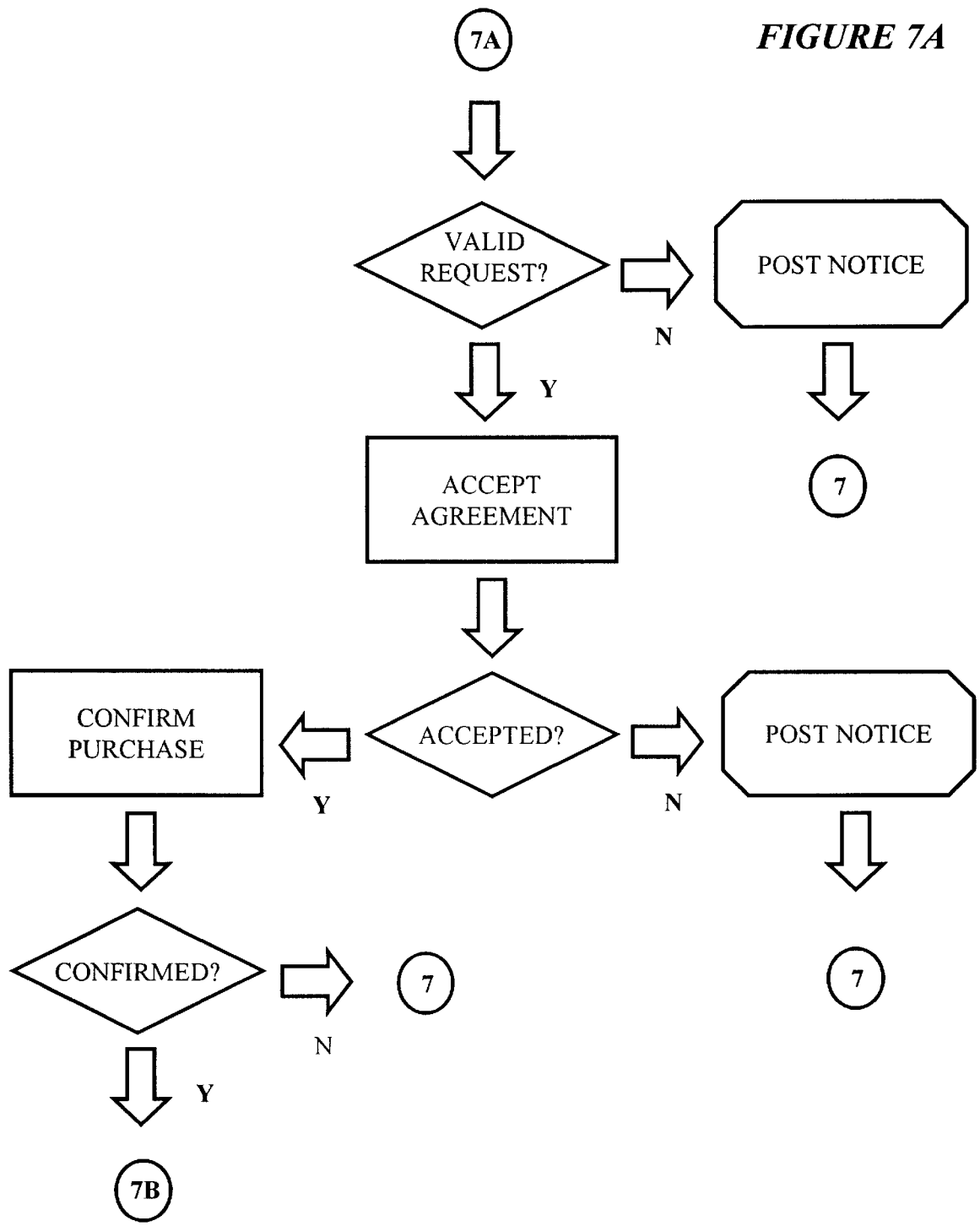
Figure 7B:
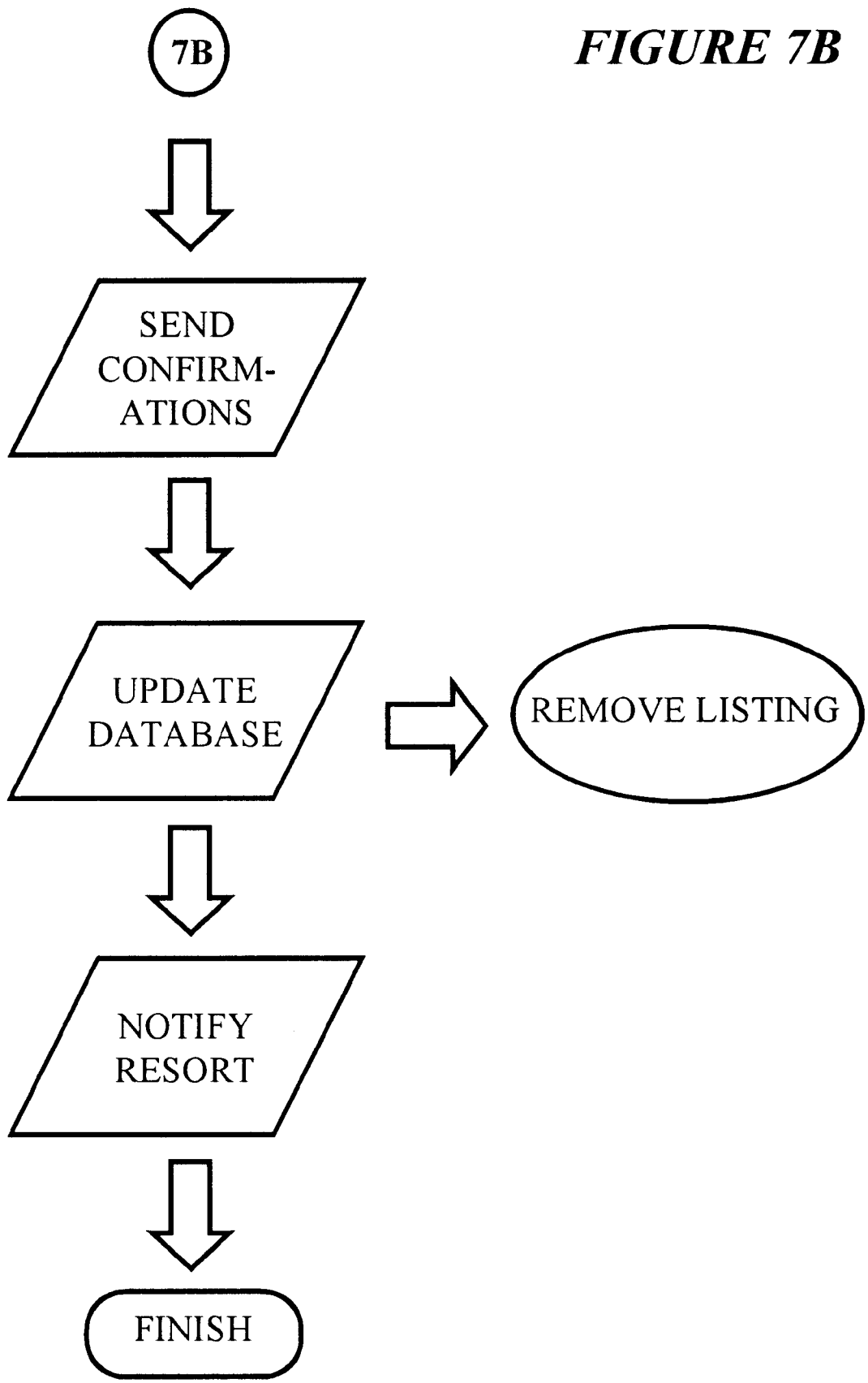

As illustrated in FIG. 7, to assist in the process of purchasing with this invention, a user begins by searching for a listing in the timeshare database. This searching process is described above. When a listing is found, the user submits a purchase request form. As illustrated in FIG. 7A, if the request is valid, that is the timeshare requested is available, the user is required to agree to the terms and conditions of the purchase or trade for the requested listing. If the user agrees, the user is asked to confirm the request. As illustrated in FIG. 7B, the request is confirmed, both owner and purchaser are automatically sent confirmation of the exchange with applicable documents. Availability of the timeshare property is removed from the timeshare database and the timeshare property management is notified of the exchange.

We claim:

1. A computer-implemented method and database for trading vacation timeshare property time interests, comprising the steps of:

a user remotely establishing communication with a central computer system having a database, said database storing a plurality of accounts, each account associated with one of a corresponding plurality of users owning interests in vacation timeshare properties;

said user remotely storing in said database an indication of a timeshare interest owned by said user, said indication including a time interval of availability of said timeshare interest;

said computer system crediting an account associated with said user in response to said user remotely storing in said database said indication of a timeshare interest owned by said user;

said user remotely searching said database in response to timeshare desirability criteria, said computer system retrieving from said database and remotely displaying for said user indications of timeshare interests meeting said desirability criteria;

said user selecting a timeshare interest from among timeshare interests remotely displayed for said user;

said computer system debiting said account associated with said user in response to said user selecting a timeshare interest; and said computer system notifying property management personnel of said timeshare interest selected by said user.

2. The computer-implemented method recited in claim 1, wherein said step of said computer system debiting said account associated with said user in response to said user selecting a timeshare interest comprises the step of said computer system determining whether said account associated with said user has a balance equivalent to said timeshare interest selected by said user.

3. The computer-implemented method recited in claim 1, wherein said step of said user remotely searching said database in response to timeshare desirability criteria comprises the step of said user indicating a geographic region in which said user desires to vacation.

4. The computer-implemented method recited in claim 1, wherein said step of said user remotely searching said database in response to timeshare desirability criteria comprises the step of said user indicating a time interval during which said user desires to vacation.

5. A computer system for trading vacation timeshare property time interests, comprising:

a database for storing a plurality of accounts, each account associated with one of a corresponding plurality of users owning interests in vacation timeshare properties;

communication means for establishing remote communication between a user and a central computer having access to said database;

storage means for storing in said database an indication of a timeshare interest owned by said user;

credit means for crediting an account associated with said user in response to said user remotely storing in said database said indication of a timeshare interest owned by said user;

search means for remotely searching said database in response to timeshare desirability criteria, said computer system retrieving from said database and remotely displaying for said user indications of timeshare interests meeting said desirability criteria;

selection means for selecting a timeshare interest from among timeshare interests remotely displayed for said user;

debit means for debiting said account associated with said user in response to said user selecting a timeshare interest; and notification means for notifying property management personnel of said timeshare interest selected by said user.

6. The computer system for trading vacation timeshare property time interests recited in claim 5, wherein said debit means comprises means for determining whether said account associated with said user has a balance equivalent to said timeshare interest selected by said user.

7. The computer system for trading vacation timeshare property time interests recited in claim 5, wherein said search means comprises means for searching said database in response to said user indicating a geographic region in which said user desires to vacation.

8. The computer system for trading vacation timeshare property time interests recited in claim 5, wherein said search means comprises means for searching said database in response to said user indicating a time interval during which said user desires to vacation.

* * * * *